US010362277B2

(12) United States Patent
Chae et al.

(10) Patent No.: US 10,362,277 B2
(45) Date of Patent: Jul. 23, 2019

(54) FOLLOWING APPARATUS AND FOLLOWING SYSTEM

(71) Applicant: HANWHA DEFENSE CO., LTD., Changwon-si (KR)

(72) Inventors: Hee Seo Chae, Changwon-si (KR); Jik Han Jung, Changwon-si (KR); Yun Geun Choe, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 58 days.

(21) Appl. No.: 15/440,087

(22) Filed: Feb. 23, 2017

(65) Prior Publication Data
US 2018/0146168 A1 May 24, 2018

(30) Foreign Application Priority Data
Nov. 23, 2016 (KR) .................. 10-2016-0156593

(51) Int. Cl.
| H04N 7/18 | (2006.01) |
| H04N 5/232 | (2006.01) |
| G05D 1/12 | (2006.01) |
| G05D 1/02 | (2006.01) |
| G05D 1/00 | (2006.01) |

(52) U.S. Cl.
CPC ........... *H04N 7/185* (2013.01); *G05D 1/0094* (2013.01); *G05D 1/0246* (2013.01); *G05D 1/12* (2013.01); *H04N 5/23203* (2013.01); *H04N 5/23212* (2013.01); *H04N 5/232123* (2018.08); *G05D 2201/02* (2013.01)

(58) Field of Classification Search
None
See application file for complete search history.

(56) References Cited

U.S. PATENT DOCUMENTS

| 5,764,786 | A | * | 6/1998 | Kuwashima | ........... G01B 11/00 |
| | | | | | 348/E5.042 |
| 7,633,383 | B2 | * | 12/2009 | Dunsmoir | .......... G06K 9/00805 |
| | | | | | 340/435 |
| 7,668,338 | B2 | | 2/2010 | Yoon et al. | |
| 8,599,267 | B2 | * | 12/2013 | Kuwano | ............ G06K 9/00228 |
| | | | | | 348/135 |
| 9,052,746 | B2 | * | 6/2015 | Kennett | .................... G06T 7/66 |
| 9,142,034 | B2 | * | 9/2015 | Hoof | ..................... G06T 7/2086 |
| 9,159,140 | B2 | * | 10/2015 | Hoof | ..................... G06T 7/2086 |

(Continued)

FOREIGN PATENT DOCUMENTS

| JP | 4715787 B2 | 7/2011 |
| KR | 1020140049152 A | 4/2014 |
| KR | 101486308 B1 | 2/2015 |

*Primary Examiner* — Mohammad J Rahman
(74) *Attorney, Agent, or Firm* — Sughrue Mion, PLLC

(57) ABSTRACT

A following apparatus which follows a target object while photographing the target object includes a driving apparatus configured to move a main body, a photographing portion configured to continuously photograph the target object, and a controller configured to obtain an area value of the target object in a live-view motion picture from the photographing portion, obtain a distance value according to the obtained area value, and control the driving apparatus to maintain a distance between the photographing portion and the target object at a reference distance value according to the obtained distance value.

16 Claims, 13 Drawing Sheets

(56) References Cited

U.S. PATENT DOCUMENTS

| | | | |
|---|---|---|---|
| 9,314,924 B1* | 4/2016 | Laurent | B25J 9/163 |
| 9,430,706 B1* | 8/2016 | Peleg | G06K 9/00765 |
| 9,477,098 B2* | 10/2016 | Contet | G02C 7/027 |
| 9,530,210 B2* | 12/2016 | Matono | G08G 1/166 |
| 9,767,568 B2* | 9/2017 | Ikenoue | G06T 7/248 |
| 2008/0278589 A1* | 11/2008 | Thorn | H04N 5/23212 |
| | | | 348/208.14 |
| 2009/0096664 A1* | 4/2009 | Carroll | G01S 7/4026 |
| | | | 342/147 |
| 2009/0135292 A1* | 5/2009 | Muramatsu | G03B 13/18 |
| | | | 348/349 |
| 2009/0231447 A1* | 9/2009 | Paik | G01S 3/7864 |
| | | | 348/208.4 |
| 2009/0296986 A1* | 12/2009 | Obana | G06T 7/246 |
| | | | 382/103 |
| 2010/0087955 A1* | 4/2010 | Tsusaka | B25J 9/0003 |
| | | | 700/245 |
| 2010/0091295 A1* | 4/2010 | Nebosis | G01B 9/02012 |
| | | | 356/496 |
| 2010/0250030 A1* | 9/2010 | Nichols | G01C 23/005 |
| | | | 701/7 |
| 2011/0133914 A1* | 6/2011 | Griffin | G01S 17/48 |
| | | | 340/435 |
| 2011/0304719 A1* | 12/2011 | Sekine | G06K 9/00255 |
| | | | 348/77 |
| 2012/0072170 A1* | 3/2012 | McKendrick | G01B 11/005 |
| | | | 702/150 |
| 2013/0321763 A1* | 12/2013 | Haddadi | A61B 3/11 |
| | | | 351/204 |
| 2014/0107842 A1 | 4/2014 | Yoon et al. | |
| 2014/0123508 A1* | 5/2014 | Graesser | G01C 15/002 |
| | | | 33/228 |
| 2014/0232650 A1* | 8/2014 | Kennett | G06T 7/66 |
| | | | 345/158 |
| 2014/0267381 A1* | 9/2014 | Young | G06T 7/0002 |
| | | | 345/619 |
| 2014/0267611 A1* | 9/2014 | Kennett | G06K 9/00335 |
| | | | 348/46 |
| 2014/0270387 A1* | 9/2014 | Hoof | G06T 7/2086 |
| | | | 382/107 |
| 2015/0036886 A1* | 2/2015 | Matono | G08G 1/166 |
| | | | 382/106 |
| 2015/0124214 A1* | 5/2015 | Contet | G02C 7/027 |
| | | | 351/204 |
| 2016/0015471 A1* | 1/2016 | Piron | A61B 34/10 |
| | | | 600/424 |
| 2016/0080638 A1* | 3/2016 | Kotzur | G06T 7/80 |
| | | | 348/135 |
| 2016/0110610 A1* | 4/2016 | Ikenoue | G06T 7/248 |
| | | | 382/103 |
| 2016/0166862 A1* | 6/2016 | Qui | A62C 3/025 |
| | | | 169/24 |
| 2016/0312446 A1* | 10/2016 | Pettersson | E02F 9/262 |
| 2016/0354929 A1* | 12/2016 | Ishige | B25J 9/1697 |
| 2017/0064180 A1* | 3/2017 | Kitagawa | G06K 9/00771 |
| 2017/0076428 A1* | 3/2017 | Ishikawa | H04N 9/3188 |
| 2017/0090722 A1* | 3/2017 | Matsuzoe | G06F 3/04817 |
| 2017/0143429 A1* | 5/2017 | Richmond | A61B 5/064 |
| 2018/0120428 A1* | 5/2018 | Tuxen | G01S 7/35 |

* cited by examiner

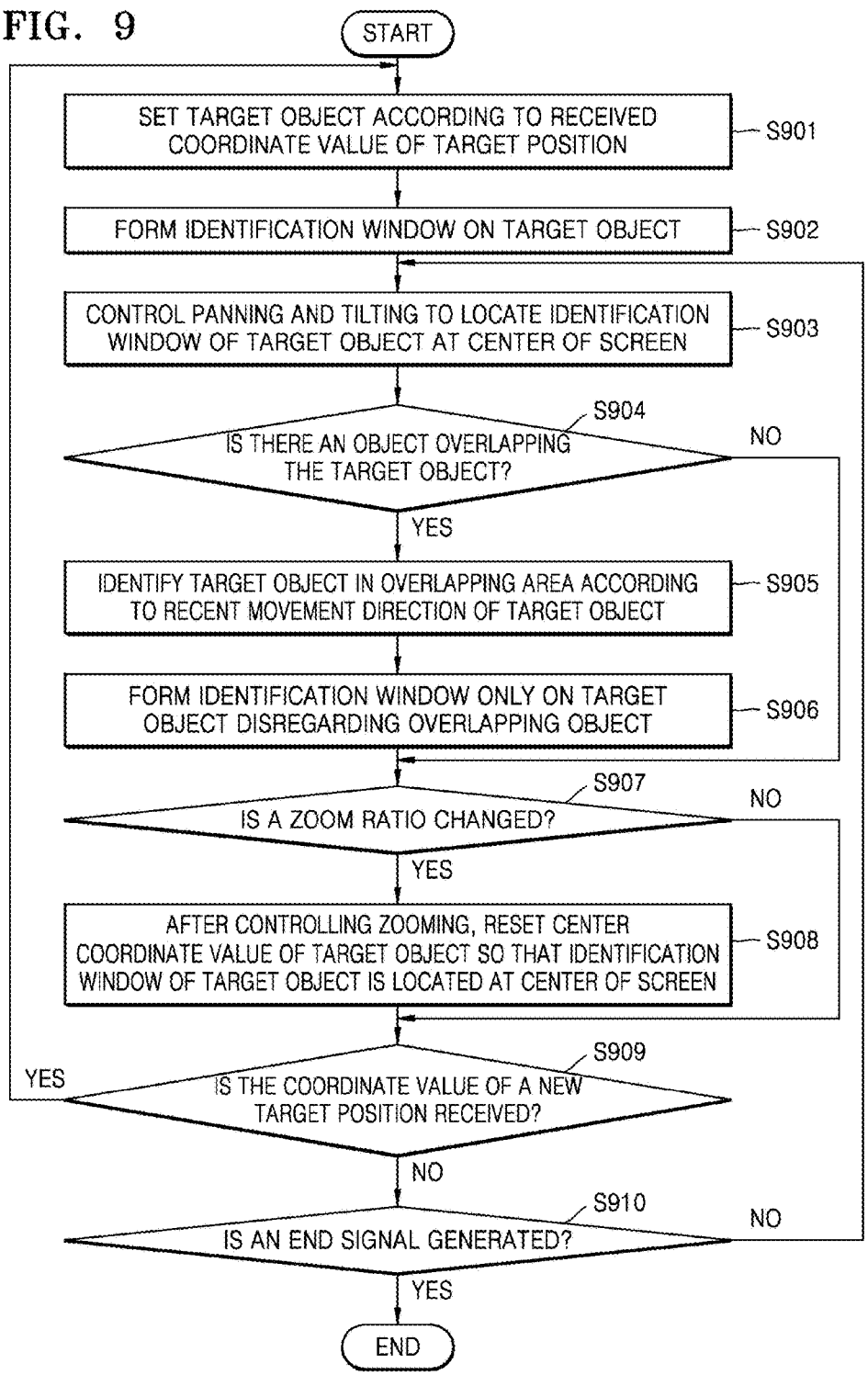

FOLLOWING APPARATUS AND FOLLOWING SYSTEM

CROSS-REFERENCE TO RELATED APPLICATION

This application claims priority from of Korean Patent Application No. 10-2016-0156593, filed on Nov. 23, 2016, in the Korean Intellectual Property Office, the disclosure of which is incorporated herein in its entirety by reference.

BACKGROUND

1. Field

One or more exemplary embodiments relate to a following apparatus and a following system, and more particularly, to a following apparatus that follows a target object and a following system including the following apparatus.

2. Description of the Related Art

In general, a following system includes a following apparatus and a remote control apparatus.

The remote control apparatus remotely controls an operation of the following apparatus according to a user input while displaying a motion picture from the following apparatus.

The following apparatus may follow a person or a vehicle by autonomous driving. Examples of the following apparatus may include following robots, unmanned ground vehicles (UGVs), and unmanned aerial vehicles (UAVs) such as drones.

In the following apparatus, a following speed needs to be controlled to maintain a distance with respect to a target object to be a reference distance value.

In a following apparatus according to a related art, a specific part of an image of a target object is set to be a search target image. In other words, in the following apparatus according to the related art, the specific part of the image of the target object is searched for and a distance value with respect to the searched specific part is calculated. Accordingly, the following problems may occur.

First, when the specific part of the image of the target object cannot be searched for, it is difficult to follow the target object.

Second, when the image of the target object is unclear, it is difficult to calculate a distance value with respect to the specific part.

Such problems in the related art are considered as matters that were addressed by the inventors in deriving the present inventive concept or as matters discovered during the course of deriving the present inventive concept. Thus, the problems may not simply be referred to as information which was known to the general public prior to the filing of the present disclosure.

SUMMARY

One or more exemplary embodiments of the present disclosure include a following apparatus which may follow a target object by maintaining a constant distance with respect to the target object even when a specific part of an image of the target object cannot be searched for or the image of the target object is unclear, and a following system including the following apparatus.

Additional aspects will be set forth in part in the description which follows and, in part, will be apparent from the description, or may be learned by practice of the exemplary embodiments presented herein.

According to one or more exemplary embodiments, a following apparatus which follows a target object while photographing the target object includes a driving apparatus configured to move a main body, a photographing portion configured to continuously photograph the target object, and a controller configured to obtain an area value of the target object in a live-view motion picture from the photographing portion, obtain a distance value according to the obtained value, and control the driving apparatus to maintain a distance between the photographing portion and the target object at a reference distance value according to the obtained distance value.

The controller may control the driving apparatus to move the main body at a reference speed when the obtained distance value is equal to the reference distance value, at a speed lower than the reference speed when the obtained distance value is less than the reference distance value, and at a speed higher than the reference speed when the obtained distance value is greater than the reference distance value.

The controller may obtain a sharpness value of the target object in the live-view motion picture from the photographing portion, set a first threshold value with respect to the sharpness value of the target object, and, control the driving apparatus according to an obtained distance value when the sharpness value of the target object is not less than the first threshold value. The controller may set a second threshold value with respect to the sharpness value of the target object, the first threshold value being less than the second threshold value. When the sharpness value of the target object is less than the first threshold, the photographing portion may perform autofocusing until the sharpness value of the target object is equal to the second threshold value and provides position information of a focus lens to the controller. The controller may obtain a movement distance value of the focus lens when the sharpness value of the target object is equal to the second threshold value, correct the obtained distance value according to an obtained movement distance value of the focus lens, and control the driving apparatus according to the corrected distance value, when the sharpness value of the target object is less than the first threshold value.

In the correction of the obtained distance value according to the obtained movement distance value of the focus lens, the controller may determine whether an area of the target object is changed, decreases the obtained distance value according to the obtained movement distance value of the focus lens when the area of the target object increases, and increase the obtained distance value according to the obtained movement distance value of the focus lens when the area of the target object decreases. The controller corrects the obtained distance value according to an increase/decrease distance value corresponding to the obtained movement distance value of the focus lens using a look-up table.

When the photographing portion does not perform autofocusing, and the sharpness value of the target object is less than the first threshold value, the controller may determine whether an area of the target object is changed, control the driving apparatus to decelerate when the area of the target object increases, and control the driving apparatus to accelerate when the area of the target object decreases.

The controller may obtain the distance value corresponding to the obtained area value using a look-up table, and control the driving apparatus according to a moving speed corresponding to the obtained distance value using the look-up table.

The controller may control panning and tilting of the photographing portion so that an identification window of the target object is located at a center of a screen.

When there is an overlapping object that overlaps the target object in a live-view motion picture from the photographing portion, the controller may identify the target object in an overlapping area along a recent movement direction of the target object.

The controller may form an identification window only on the target object while disregarding the overlapping object.

When a zoom ratio of the photographing portion is changed, the controller may control zooming of the photographing portion and reset a center coordinate value of the target object so that the identification window of the target object is located at the center of the screen.

According to one or more exemplary embodiments, a following system includes a following apparatus configured to follow a target object while photographing the target object, and a remote control apparatus includes a display, the remote control apparatus being configured to remotely control an operation of the following apparatus according to a user input while displaying a motion picture from the following apparatus. The following apparatus obtains an area value of the target object and a sharpness value of the target object from a live-view motion picture generated by photographing, and controls a following speed to maintain a distance with respect to the target object at a reference distance value according to the obtained area value. The following apparatus may obtain a sharpness value of the target object from the live-view motion picture and control the following speed according to the obtained distance value and the obtained sharpness value.

When a position is selected from a displayed live-view motion picture, the remote control apparatus may transmit a coordinate value of a selected position, and the following apparatus may set an object corresponding to the coordinate value of the selected position from the remote control apparatus to be the target object.

The following apparatus may control panning and tilting of the photographing so that an identification window of the target object is located at a center of the display of the remote control apparatus. When a zoom ratio is received from the remote control apparatus by the following apparatus, the following apparatus may control zooming of the photographing and reset a center coordinate value of the target object so that an identification window of the target object is located at a center of the display of the remote control apparatus.

BRIEF DESCRIPTION OF THE DRAWINGS

These and/or other aspects will become apparent and more readily appreciated from the following description of the exemplary embodiments, taken in conjunction with the accompanying drawings in which:

FIG. 9 is a flowchart of an example of a photographing control operation of the controller of FIG. 2;

DETAILED DESCRIPTION

Figure 1:
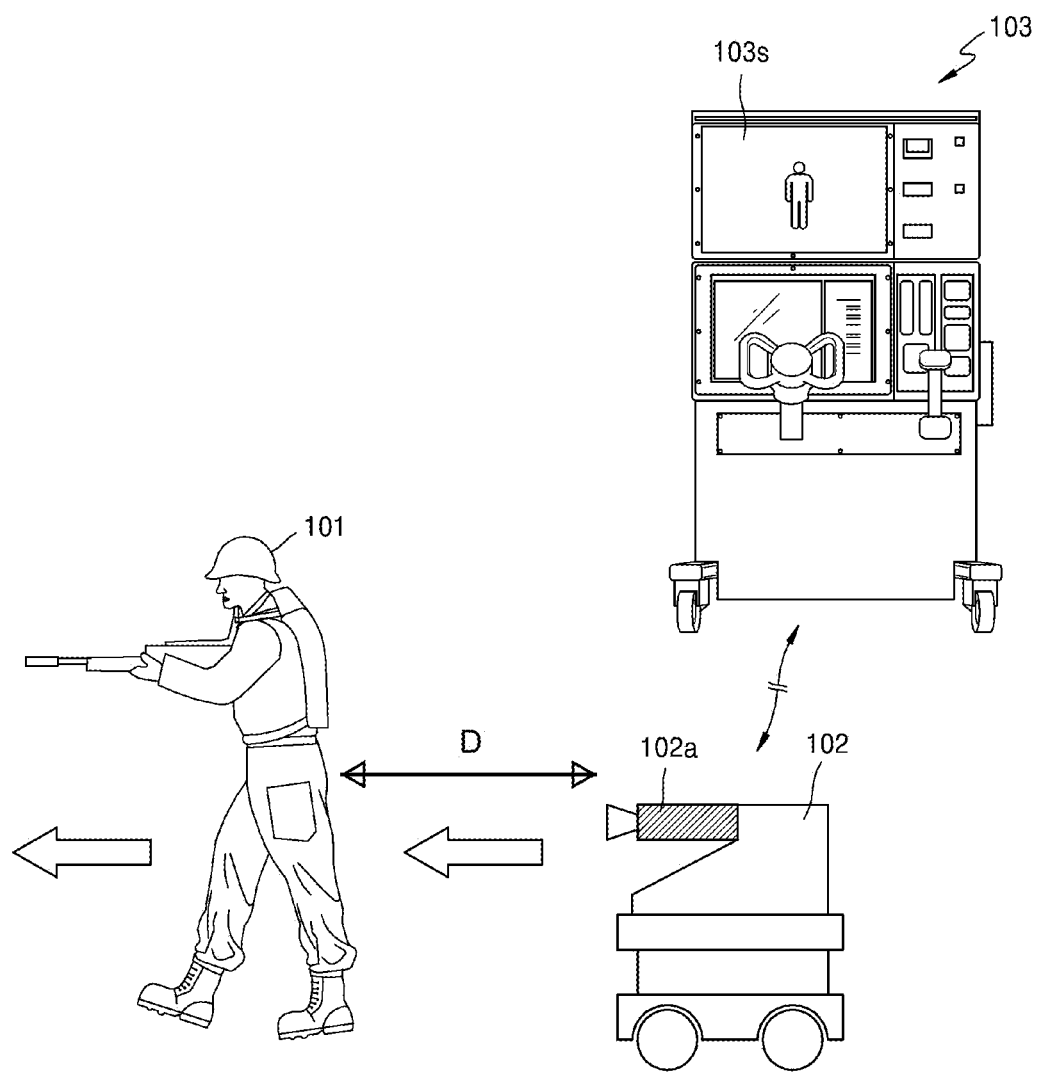
FIG. 1 illustrates a following system according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present disclosure.

Figure 2:
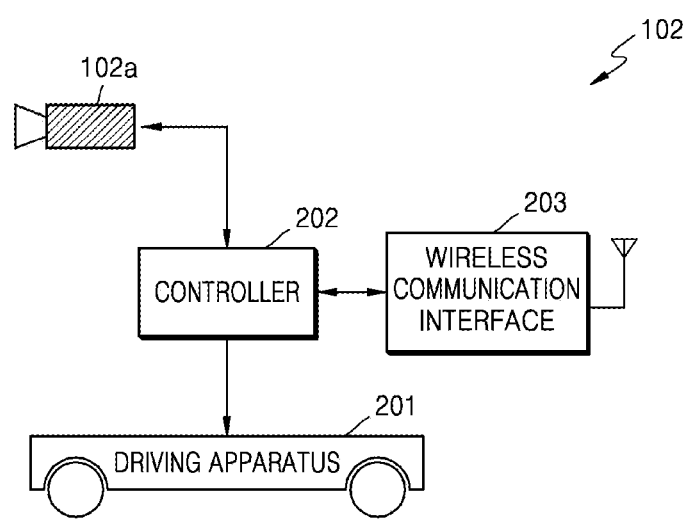
FIG. 2 is a block diagram of a structure of a following apparatus included in the following system of FIG. 1.

FIG. 1 illustrates a following system according to an exemplary embodiment. FIG. 2 is a block diagram of a structure of a following apparatus 102 included in the following system of FIG. 1. The following system of a first exemplary embodiment and the following apparatus are described below with reference to FIGS. 1 and 2.

The following system of the first exemplary embodiment may include the following apparatus 102 and a remote control apparatus 103.

The following apparatus 102 follows a target object 101 while photographing the target object 101. In FIG. 1, the following apparatus 102 is illustrated as a following robot. However, the following apparatus 102 may be an unmanned aerial vehicle (UAV) such as a drone or an unmanned ground vehicle (UGV).

The remote control apparatus 103, which is typically called an operation control device, remotely controls the operation of the following apparatus 102 according to a user input while displaying on a display panel 103s a live-view motion picture from the following apparatus 102.

When a position is selected from a live-view motion picture displayed on the display panel 103s, the remote control apparatus 103 transmits a coordinate value of a selected position to the following apparatus 102. The position may be selected as a user double-clicks a mouse. When the display panel 103s is a touch-display panel, the position may be selected as a user double taps a screen by using a finger.

The coordinate value from the remote control apparatus 103 is input to a controller 202 via a wireless communication interface 203 in the following apparatus 102. The controller 202 of the following apparatus 102 sets an object corresponding to the coordinate value from the remote control apparatus 103 to be a target object.

The following apparatus 102 obtains an area value of the target object 101 and a sharpness value of the target object 101 from a live-view motion picture generated by a photographing portion 102a. Furthermore, the following apparatus 102 controls a following speed according to the obtained area value and sharpness value, to maintain a distance D with respect to the target object 101 at a reference distance value.

The following apparatus 102 may include a driving apparatus 201, the photographing portion 102a, and the controller 202.

The driving apparatus 201 moves a main body.

The photographing portion 102a continuously photographs the target object 101 by performing panning and tilting.

The controller 202 obtains an area value of the target object 101 and a sharpness value of the target object 101 from the live-view motion picture generated by the photographing portion 102a. Furthermore, the controller 202 controls the driving apparatus 201 according to the obtained area value and sharpness value, to maintain a distance D between the photographing portion 102a and the target object 101 at a reference distance value.

According to the following apparatus 102 or the following system of the first exemplary embodiment, a following speed is controlled according to the area value of the target object 101 and the sharpness value of the target object 101 in the live-view motion picture to maintain the distance D with respect to the target object 101 at the reference distance value. Accordingly, the following effects may be obtained.

First, instead of following a specific part of an image of the target object 101, the image of the target object 101 itself may be followed.

Accordingly, continuous following is possible even when the specific part of an image of the target object 101 cannot be searched for.

Furthermore, by using the above effect, the following apparatus 102 may directly set an object corresponding to the coordinate value from the remote control apparatus 103 to be the target object 101. Accordingly, a user of the remote control apparatus 103 may set or change the target object 101 through a simple selection manipulation.

Second, since the following speed is controlled not only by an area value of the target object 101, but also by a sharpness value of the target object 101, the following speed may be appropriately controlled even when an image of the target object 101 is unclear.

For example, the controller 202 may obtain a distance value between the photographing portion 102a and the target object 101 according to the area value of the target object 101, and may control the following speed according to the obtained distance value. In this state, when the image of the target object 101 is unclear, the distance value or following speed with respect to the target object 101 may be appropriately changed by using the sharpness of the target object 101.

Figure 3:
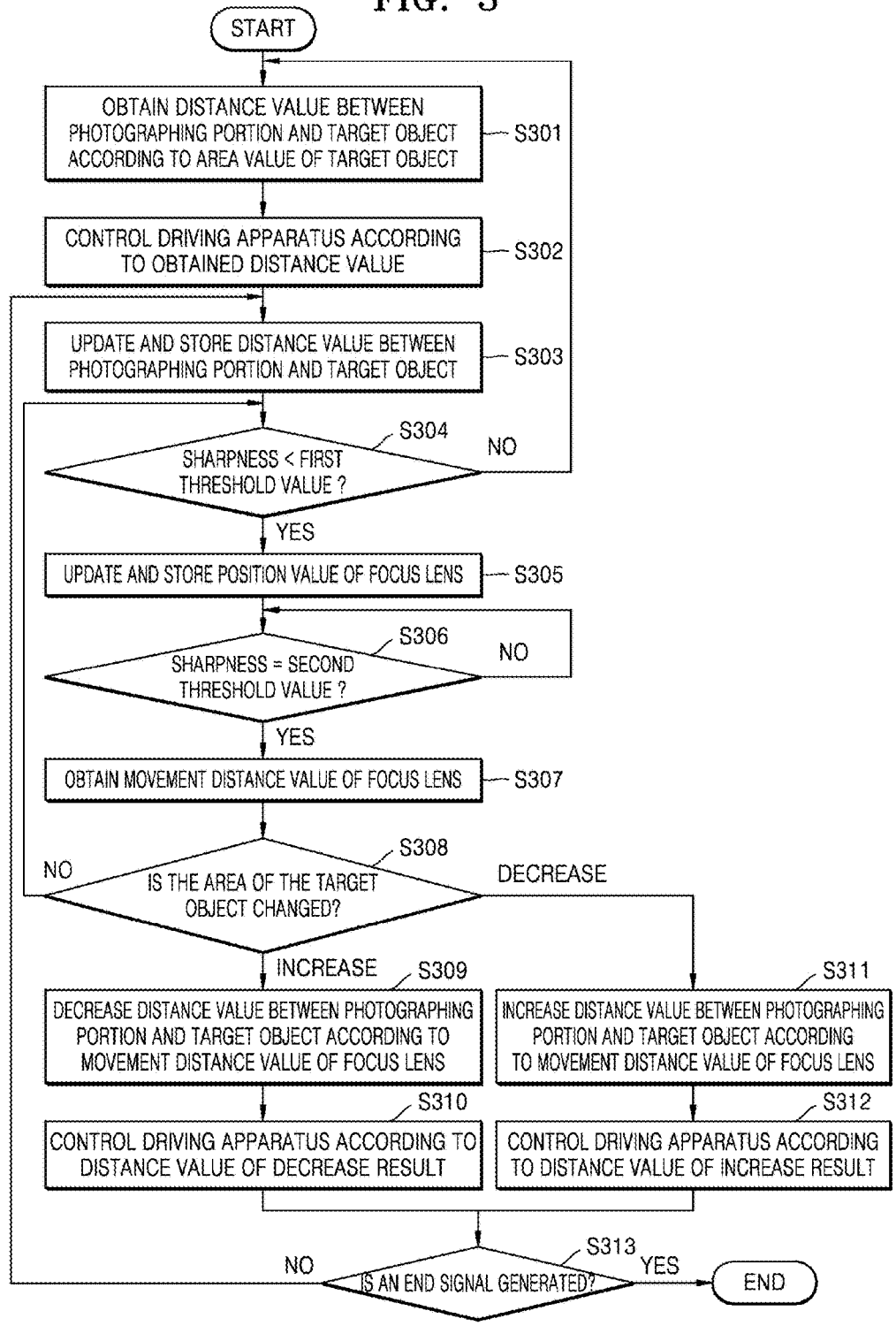
FIG. 3 is a flowchart of a first example of a speed control operation of a controller of FIG. 2.

FIG. 3 is a flowchart of a first example of a speed control operation of the controller 202 of FIG. 2.

Figure 4:
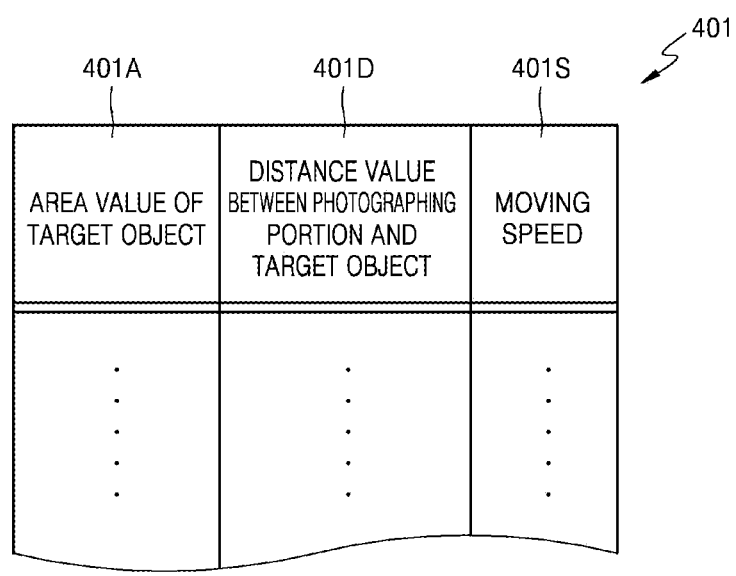
FIG. 4 is a look-up table 401 used in the operations S301 and S302 of FIG. 3.

FIG. 4 is a look-up table 401 used in the operations S301 and S302 of FIG. 3.

Figure 5A:
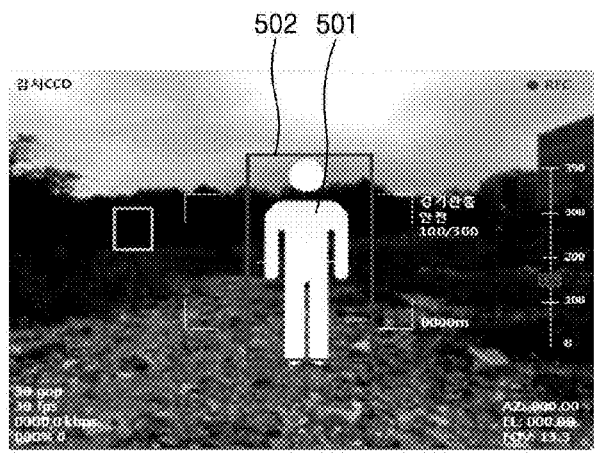
FIG. 5A is a simulation image when a distance between a photographing portion of FIG. 1, which performs autofocusing, and a target object is 100 m.

FIG. 5A is a simulation image when a distance between the photographing portion 102a of FIG. 1, which performs autofocusing, and the target object 101 is 100 m.

Figure 5B:
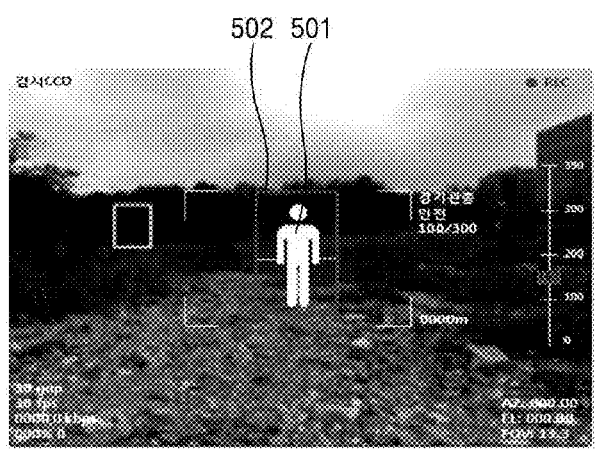
FIG. 5B is a simulation image when a distance between the photographing portion of FIG. 1, which performs autofocusing, and the target object is 300 m.

FIG. 5B is a simulation image when a distance between the photographing portion 102a of FIG. 1, which performs autofocusing, and the target object 101 is 300 m.

Figure 6:
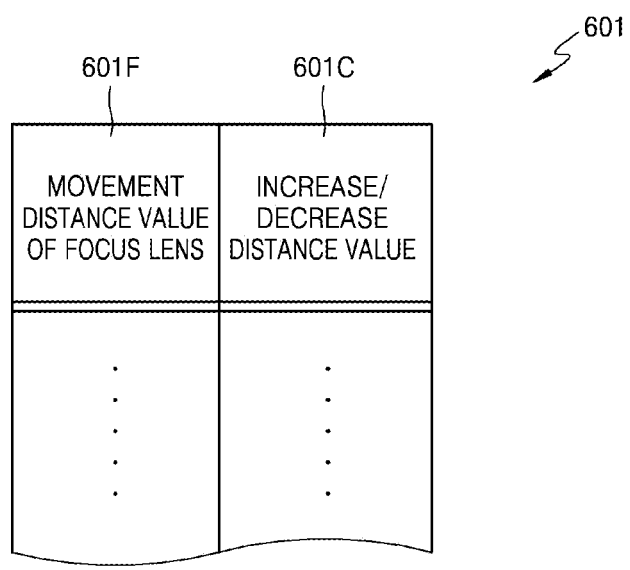
FIG. 6 is an example of a look-up table 601 used in the operations S309 and S311 of FIG. 3.

FIG. 6 is an example of a look-up table 601 used in the operations S309 and S311 of FIG. 3.

Referring to FIGS. 1 to 6, the first example of the speed control operation of FIG. 3 is described. The controller 202 sets a first threshold value and a second threshold value with respect to the sharpness value of the target object 101. The second threshold value is less than the first threshold value. Furthermore, while performing autofocusing, the photographing portion 102a provides information about the position of a focus lens to the controller 202.

The controller 202 obtains a distance value 401D according to an area value 401A of the target object 501 in a motion picture (S301). In the first exemplary embodiment, for a faster calculation, an area value of an identification window 502 of the target object 501 is used as the area value 401A of the target object 501.

Next, the controller 202 adjusts a moving speed 401S by controlling the driving apparatus 201 according to the obtained distance value 401D (S302).

When the distance value 401D is equal to the reference distance value, the controller 202 controls the driving apparatus 201 so that the main body may move at a reference speed.

When the distance value 401D is less than the reference distance value, the controller 202 controls the driving apparatus 201 so that the main body may move at a speed lower than the reference speed.

When the distance value 401D is greater than the reference distance value, the controller 202 controls the driving apparatus 201 so that the main body may move at a speed higher than the reference speed.

Next, the controller 202 updates and stores a currently applied distance value 401D between the photographing portion 102a and the target object 101 (S303).

Since the area value 401A of the target object 501 may be precise if the sharpness value of the target object 501 is not less than the first threshold value, the operations S301 to S303 are repeatedly performed (S304).

When the sharpness value of the target object 501 is less than the first threshold value, operation S305 and the subsequent operations are performed.

In the operation S305, the controller 202 updates and stores a position value of the focus lens input from the photographing portion 102a (S305).

Next, when the sharpness is the same as the second threshold value after performing autofocusing to improve the sharpness (S306), the controller 202 obtains a movement distance value 601F of the focus lens (S307).

Next, the controller 202 determines whether the area of the target object 501 is changed (S308).

Next, the controller 202 corrects the distance value 401D according to the obtained movement distance value 601F of the focus lens, by using the change of the area or a changed state (S309 or S311). Furthermore, the controller 202 controls the driving apparatus 201 according to the corrected distance value 401D (S310 or S312).

In this state, when the sharpness is the same as the second threshold value, if the area value 401A of the target object 501 is obtained, precision of the obtained area value 401A may be deteriorated. However, the sharpness may be sufficient to determine whether the area of the target object 501 is changed. In the case of the first example of the speed control operation of FIG. 3, the movement direction of the focus lens may be used instead of the change in the area of the target object 501.

In the operation S309, when the area of the target object 501 increases, the controller 202 decreases the distance value 401D according to an increase/decrease distance value 601C corresponding to the obtained movement distance value 601F of the focus lens (in the case of FIG. 5A).

Next, the controller 202 controls the driving apparatus 201 according to a movement speed 401S corresponding to the decreased distance value 401D (S310).

In the operation S311, when the area of the target object 501 decreases, the controller 202 increases the distance value 401D according to the increase/decrease distance value 601C corresponding to the obtained movement distance value 601F of the focus lens (in the case of FIG. 5B).

Next, the controller 202 controls the driving apparatus 201 according to the movement speed 401S corresponding to the increased distance value 401D.

Next, when no external end signal is generated, the operation S303 and the subsequent operations are performed (S313).

Figure 7:
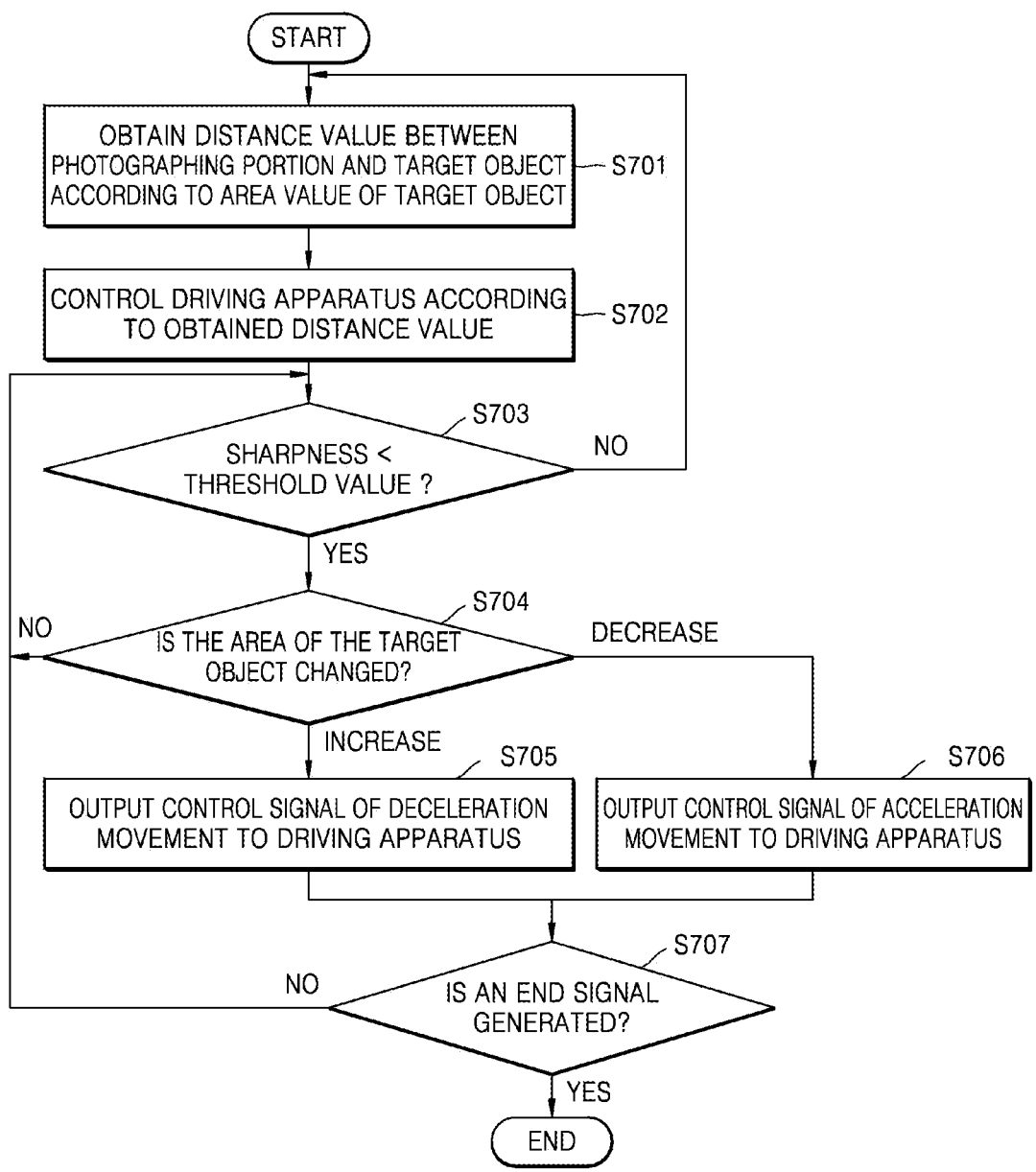
FIG. 7 is a flowchart of a second example of the speed control operation of the controller of FIG. 2.

FIG. 7 is a flowchart of a second example of the speed control operation of the controller 202 of FIG. 2.

Figure 8A:
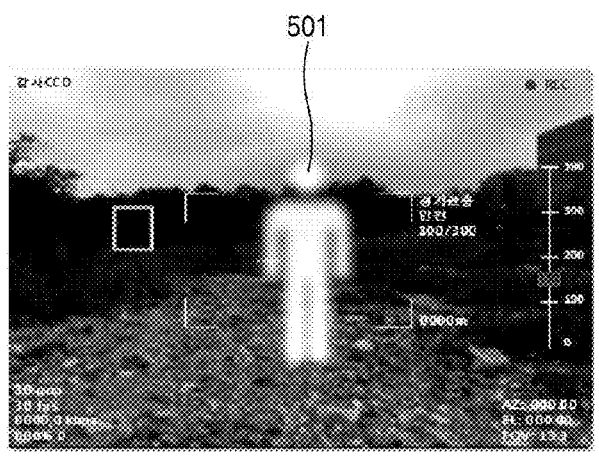
FIG. 8A is a simulation image when a distance between a photographing portion of FIG. 2, which does not perform autofocusing, and the target object is 100 m.

FIG. 8A is a simulation image when a distance between the photographing portion 102a of FIG. 2, which does not perform autofocusing, and the target object 101 is 100 m.

Figure 8B:
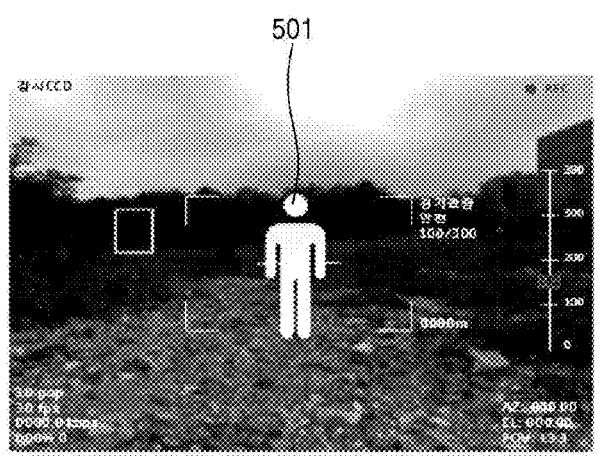
FIG. 8B is a simulation image when a distance between the photographing portion of FIG. 2, which does not perform autofocusing, and the target object is 200 m.

FIG. 8B is a simulation image when a distance between the photographing portion 102a of FIG. 2, which does not perform autofocusing, and the target object 101 is 200 m.

Figure 8C:
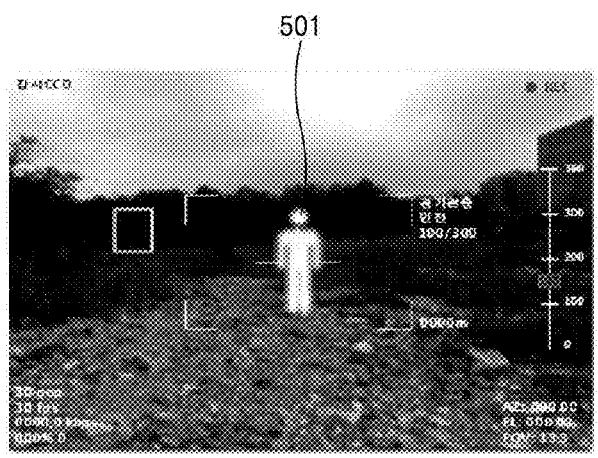
FIG. 8C is a simulation image when a distance between the photographing portion of FIG. 2, which does not perform autofocusing, and the target object is 300 m.

FIG. 8C is a simulation image when a distance between the photographing portion 102a of FIG. 2, which does not perform autofocusing, and the target object 101 is 300 m.

The second example of the speed control operation in FIG. 7 is described with reference to FIGS. 4 to 8C. In the second example of the speed control operation, the controller 202 sets a threshold value with respect to the sharpness value of the target object 501 of a motion picture. Furthermore, the photographing portion 102a does not perform autofocusing.

The controller 202 obtains the distance value 401D according to the area value 401A of the target object 501 in the motion picture (S701).

Next, the controller 202 adjusts the movement speed 401S by controlling the driving apparatus 201 according to the obtained distance value 401D (S702).

When the distance value 401D is the same as the reference distance value, the controller 202 controls the driving apparatus 201 so that the main body may move at the reference speed.

When the distance value 401D is less than the reference distance value, the controller 202 controls the driving apparatus 201 so that the main body may move at a speed lower than the reference speed.

When the distance value 401D is greater than the reference distance value, the controller 202 controls the driving apparatus 201 so that the main body may move at a speed higher than the reference speed.

Since the area value 401A of the target object 501 may be precise if the sharpness value of the target object 501 is not less than the threshold value, the operations S701 and S702 are repeatedly performed (S703).

When the sharpness value of the target object 501 is less than the threshold value, an operation S704 and the subsequent operations are performed.

In the operation S704, the controller 202 determines whether the area of the target object 501 is changed.

When the area of the target object 501 increases, the controller 202 outputs a control signal of a deceleration movement to the driving apparatus 201 (S705, the case of FIG. 8A).

When the area of the target object 501 decreases, the controller 202 outputs a control signal of an acceleration movement to the driving apparatus 201 (S706, the case of FIG. 8C).

In this state, when the sharpness deceases to be lower than the threshold value, if the area value 401A of the target object 501 is obtained, precision of the obtained area value 401A may be deteriorated. However, the sharpness may be sufficient to determine whether the area of the target object 501 is changed.

When no external end signal is generated, the operation S703 and the subsequent operations are performed (S707).

FIG. 9 is a flowchart of an example of a photographing control operation of the controller 202 of FIG. 2.

Figure 10A:
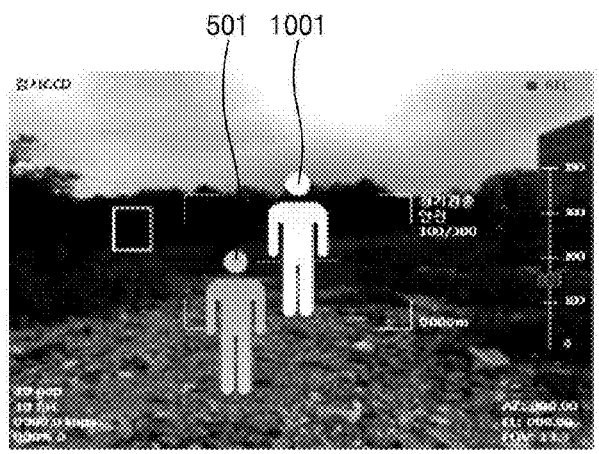
FIG. 10A is a simulation image before the target object and an overlapping object overlap each other.

FIG. 10A is a simulation image before the target object 501 and an overlapping object 1001 overlap each other.

Figure 10B:
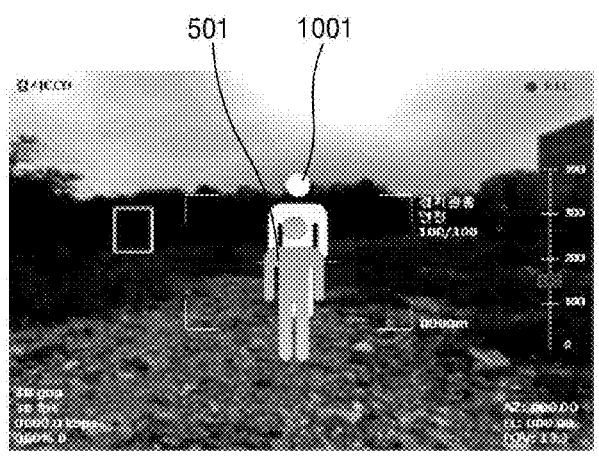
FIG. 10B is a simulation image when the target object and the overlapping object overlap each other.

FIG. 10B is a simulation image when the target object 501 and the overlapping object 1001 overlap each other.

Figure 10C:
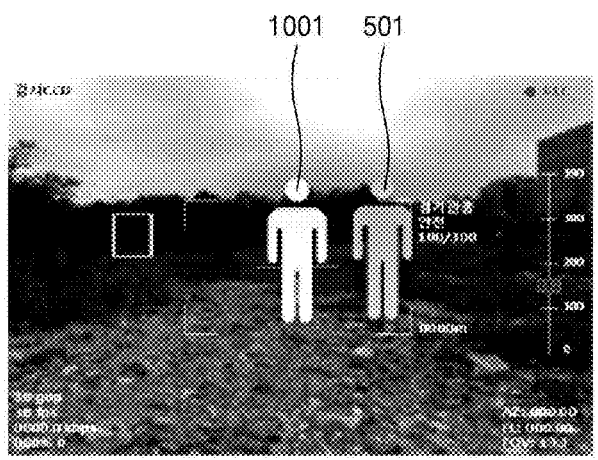
FIG. 10C is a simulation image immediately after the target object and the overlapping object overlap each other.

FIG. 10C is a simulation image immediately after the target object 501 and the overlapping object 1001 overlap each other.

Figure 11:
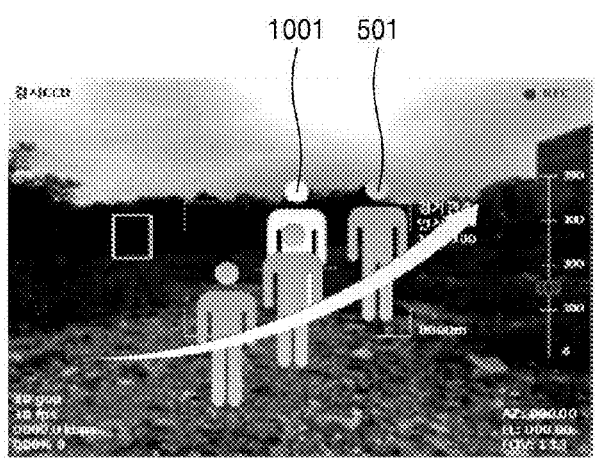
FIG. 11 is a simulation image of a recent movement direction of a target object obtained when the target object and the overlapping object overlap each other.

FIG. 11 is a simulation image of a recent movement direction of a target object obtained when the target object 501 and the overlapping object 1001 overlap each other.

Figure 12:
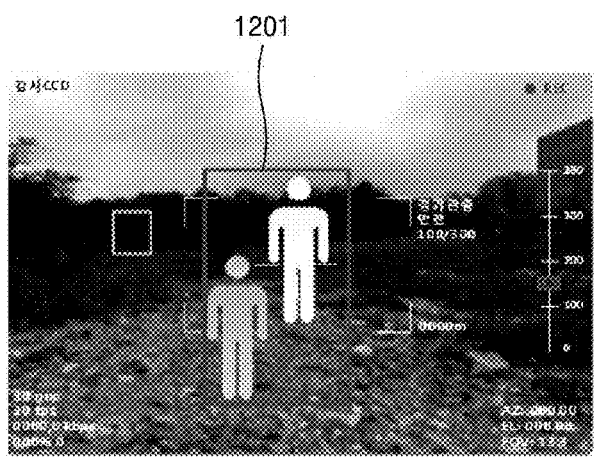
FIG. 12 is a simulation image showing that both of the target object and the overlapping object are included in an identification window in a following apparatus according to a related art.

FIG. 12 is a simulation image showing that both of the target object 501 and the overlapping object 1001 are included in an identification window 1201 in a following apparatus according to a related art.

Figure 13:
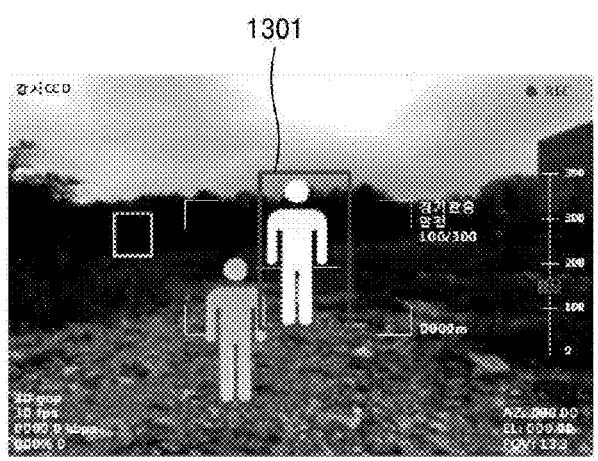
FIG. 13 is a simulation image showing that only the target object is included in an identification window in a following apparatus according to an exemplary embodiment.

FIG. 13 is a simulation image showing that only the target object 501 is included in an identification window 1301 in a following apparatus according to an embodiment.

An example of a photographing control operation of FIG. 9 is described with reference to FIGS. 1, 2, and 9 to 13.

The controller 202 sets the target object 501 in a live-view motion picture according to a coordinate value of a target position received from the remote control apparatus 103 through the wireless communication interface 203 (S901).

Next, the controller 202 forms an identification window 1301 on the target object 501 (S902).

Next, the controller 202 controls panning and tilting of the photographing portion 102a so that the identification window 1301 of the target object 501 is located at the center of a screen (S903). Accordingly, the photographing portion 102a may photograph the target object 501 while continuously following the target object 501.

Next, the controller 202 determines whether there is an overlapping object 1001 that overlaps the target object 501 (S904). The operation S904 is performed at a time point of FIG. 10A or FIG. 10B. For reference, a difference in the time point between FIG. 10A and FIG. 10B is one second.

When there is the overlapping object 1001 that overlaps the target object 501, the controller 202 identifies the target object 501 in an overlapping area along a recent movement direction of the target object 501 (S905, refer to FIGS. 10C and 11). As such, as the recent movement direction of the target object 501 is used, the target object 501 may be accurately identified in the overlapping area.

The recent movement direction of the target object 501 may be instantly seen according to a well-known optical flow. This is because the panning and tilting of the photographing portion 102a are controlled such that the identification window 1301 of the target object 501 is located at the center of the screen (refer to S903).

Furthermore, the controller 202 forms the identification window 1301 only on the target object 501, disregarding the overlapping object 1001 (S906, the case of FIG. 13). As illustrated in FIG. 12, in the following apparatus according to the related art, both of the target object 501 and the overlapping object 1001 are included in the identification window 1201 for user's reference. However, when the operation S301 or S701 is to be performed in the speed control of FIG. 3 or 7, as illustrated in FIG. 13, the identification window 1301 is formed only on the target object 501. In this case, an additional effect of lowering a probability of occurrence of an identification error in the overlapping area may be generated.

Next, the controller 202 determines whether a zoom ratio of the photographing portion 102a is changed (S907). For example, when a zoom ratio is received from the remote control apparatus 103 through the wireless communication interface 203, the controller 202 determines that the zoom ratio of the photographing portion 102a is changed. In this case, after controlling zooming of the photographing portion 102a, the controller 202 sets again a center coordinate value of the target object 501 so that the identification window 1301 of the target object 501 is located at the center of the screen (S908). Accordingly, the probability of occurrence of an identification error due to zooming may be lowered.

Next, when a coordinate value of a new target position is received, the controller 202 performs the operation S901 and the subsequent operations (S909).

Next, when no external end signal is generated, the controller 202 performs the operation S903 and the subsequent operations (S910).

As described above, in the following apparatus according to the above embodiments or the following system including the following apparatus, according to the area value of the target object and the sharpness value of the target object in a live-view motion picture, a following speed is controlled to maintain a distance with respect to the target object at the reference distance value. Accordingly, the following effects may be obtained.

First, instead of following a specific part of an image of a target object, the image of the target object itself may be followed.

Accordingly, continuous following is possible even when the specific part of an image of the target object cannot be searched for.

Furthermore, by using the above effect, the following apparatus may directly set an object corresponding to the coordinate value from the remote control apparatus to be the target object. Accordingly, a user of the remote control apparatus may set or change the target object through a simple selection manipulation.

Second, since the following speed is controlled not only by an area value of the target object, but also by a sharpness value of the target object, the following speed may be appropriately controlled even when an image of the target object is unclear.

For example, the controller may obtain a distance value according to the area value of the target object, and may control the following speed according to the obtained distance value. In this state, when the image of the target object is unclear, the distance value or following speed with respect to the target object may be appropriately changed by using the sharpness of the target object.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more embodiments have been described with reference to the figures, it will be understood by those of ordinary skill in the art that various changes in form and details may be made therein without departing from the spirit and scope as defined by the following claims.

What is claimed is:

1. A following apparatus which follows a target object while photographing the target object, the following apparatus comprising:
    a driving apparatus configured to move a main body;
    a photographing portion configured to continuously photograph the target object; and
    a controller configured to:
        obtain an area size value of an identification window of the target object in a live-view motion picture from the photographing portion,
        obtain a distance value according to the obtained area size value,
        obtain a sharpness value of the target object in the live-view motion picture from the photographing portion,
        set a first threshold value with respect to the sharpness value of the target object,
        when the sharpness value of the target object is not less than the first threshold value, control the driving apparatus to maintain a distance between the photographing portion and the target object at a reference distance value using one method that is based on the obtained distance value, and
        when the sharpness value of the target object is less than the first threshold value, control the driving apparatus using another method that is different from the one method,
    wherein the other method is based on at least one of a movement distance value of a focus lens and a direction of change of the area size value of the identification window of the target object.

2. The following apparatus of claim 1, wherein the controller controls the driving apparatus to move the main body at a reference speed when the obtained distance value is equal to the reference distance value, at a speed lower than the reference speed when the obtained distance value is less than the reference distance value, and at a speed higher than the reference speed when the obtained distance value is greater than the reference distance value.

3. The following apparatus of claim 1, wherein the controller sets a second threshold value with respect to the sharpness value of the target object, the second threshold value being less than the first threshold value, and
    when the sharpness value of the target object is less than the first threshold value:
        the photographing portion performs autofocusing until the sharpness value of the target object is equal to the second threshold value and provides position information of a focus lens to the controller, and the controller obtains a movement distance value of the focus lens when the sharpness value of the target object is equal to the second threshold value, corrects the obtained distance value between the photographing portion and the target object according to an obtained movement distance value of the focus lens, and controls the driving apparatus according to a corrected distance value.

4. The following apparatus of claim 3, wherein, in the correction of the obtained distance value according to the obtained movement distance value of the focus lens, the controller determines whether the area size value of the identification window the target object is changed, decreases the obtained distance value according to the obtained movement distance value of the focus lens when the area size value of the target object increases, and increases the obtained distance value according to the obtained movement distance value of the focus lens when the area size value of the target object decreases.

5. The following apparatus of claim 3, wherein the controller corrects the obtained distance value according to an increase/decrease distance value corresponding to the obtained movement distance value of the focus lens using a look-up table.

6. The following apparatus of claim 1, wherein, when the sharpness value of the target object is less than the first threshold value, the controller determines whether an area of the target object is changed, controls the driving apparatus to decelerate when the area size value of the identification window of the target object increases, and controls the driving apparatus to accelerate when the area size value of the identification window of the target object decreases.

7. The following apparatus of claim 6, wherein the photographing portion does not perform autofocusing when photographing the target object.

8. The following apparatus of claim 1, wherein the controller obtains the distance value corresponding to the obtained area size value using a look-up table, and the controller controls the driving apparatus according to a moving speed corresponding to the obtained distance value using the look-up table.

9. The following apparatus of claim 1, wherein the controller controls panning and tilting of the photographing portion so that the identification window of the target object is located at a center of a screen.

10. The following apparatus of claim 9, wherein, when there is an overlapping object that overlaps the target object in a live-view motion picture from the photographing portion, the controller identifies the target object in an overlapping area along a recent movement direction of the target object.

11. The following apparatus of claim 10, wherein the controller forms an identification window only on the target object while disregarding the overlapping object.

12. The following apparatus of claim 9, wherein, when a zoom ratio of the photographing portion is changed, the controller controls zooming of the photographing portion and resets a center coordinate value of the target object so that the identification window of the target object is located at the center of the screen.

13. A following system comprising:

a following apparatus configured to follow a target object while photographing the target object; and a remote control apparatus comprising a display, and configured to remotely control an operation of the following apparatus according to a user input while displaying a motion picture from the following apparatus on the display, wherein the following apparatus:

obtains an area size value of an identification window of the target object from a live-view motion picture generated by the photographing, and obtains a sharpness value of the target object in the live-view motion picture, sets a threshold value with respect to the sharpness value of the target object, when the sharpness value of the target object is not less than the threshold value, controls a following speed to maintain a distance with respect to the target object at a reference distance value using one method that is based on the obtained area size value, and when the sharpness value of the target object is less than the threshold value, control the driving apparatus using another method that is different from the one method, wherein the other method is based on at least one of a movement distance value of a focus lens and a direction of change of the area size value of the identification window of the target object.

14. The following system of claim 13, wherein, when a position is selected from a displayed live-view motion picture, the remote control apparatus transmits a coordinate value of a selected position, and the following apparatus sets an object corresponding to the coordinate value of the selected position from the remote control apparatus to be the target object.

15. The following system of claim 13, wherein the following apparatus controls panning and tilting of the photographing so that an identification window of the target object is located at a center of the display of the remote control apparatus.

16. The following system of claim 13, wherein, when a zoom ratio is received from the remote control apparatus by the following apparatus, the following apparatus controls zooming of the photographing and resets a center coordinate value of the target object so that an identification window of the target object is located at a center of the display of the remote control apparatus.

* * * * *